United States Patent [19]

Yoneda et al.

[11] Patent Number: 4,740,902
[45] Date of Patent: Apr. 26, 1988

[54] NUMERICAL CONTROL APPARATUS HAVING MEMORY STORAGE FOR MACHINE PATTERNS, PLURAL INDIVIDUALLY SELECTABLE REMACHINING PATTERNS, AND CONTROL PARAMETERS

[75] Inventors: Takao Yoneda, Toyoake; Yasuji Sakakibara, Hekinan, both of Japan

[73] Assignee: Toyoda Koki Kabushiki Kaisha, Aichi, Japan

[21] Appl. No.: 746,788

[22] Filed: Jun. 20, 1985

[30] Foreign Application Priority Data

Jun. 25, 1984 [JP] Japan .................................. 59-131420

[51] Int. Cl.$^4$ ...................... B24B 49/00; G05B 19/18
[52] U.S. Cl. ................................................... 364/474
[58] Field of Search .................. 364/191, 192, 474

[56] References Cited

U.S. PATENT DOCUMENTS

| | | | |
|---|---|---|---|
| 4,328,550 | 5/1982 | Weber | 364/474 |
| 4,337,599 | 7/1982 | Koide et al. | 51/289 |
| 4,445,182 | 4/1984 | Morita et al. | 364/474 |
| 4,446,525 | 5/1984 | Hoch et al. | 364/474 |
| 4,482,963 | 11/1984 | Lenahan et al. | 364/463 |
| 4,498,259 | 2/1985 | Yamamoto et al. | 364/474 X |
| 4,513,380 | 4/1985 | Spooner | 364/474 |
| 4,521,860 | 5/1985 | Kanematsu et al. | 364/474 |
| 4,530,046 | 7/1985 | Munekata et al. | 364/191 |
| 4,604,705 | 8/1986 | Imanishi | 364/474 |
| 4,606,001 | 8/1986 | Rieben et al. | 364/474 X |
| 4,608,643 | 8/1986 | Breitenstein et al. | 364/474 |

Primary Examiner—Jerry Smith
Assistant Examiner—Clark A. Jablon
Attorney, Agent, or Firm—Oblon, Fisher, Spivak, McClelland & Maier

[57] ABSTRACT

A computerized numerical controller for a grinding machine is provided with a memory device for storing a plurality of remachining operation programs and first and second data. Each of the operation programs in the memory device defines a grinding cycle pattern in which a tool support and a work table are to be moved for remachining one of previously finished portions of a workpiece rotatably carried on the work table. When the remachining of one portion of the workpiece is to be done for the purpose of correcting the dimension of the one portion, a manual data input device is manipulated to input the first data designating one of the remachining operation programs in addition to the second data indicative of feed amounts and rates through and at which the tool support and the work table are to be moved in accordance with one of the remachining operation programs designated by the first data. Upon completion of this data inputting, a manual pulse generator is manipulated to move a grinding wheel on the tool support to a start position from which the remachining operation is to be initiated. Then, a remachining start switch is depressed, in response to which the numerical controller controls movements of the tool support and the work table in accordance with the designated one of the remachining operation programs and the second data.

4 Claims, 7 Drawing Sheets

| #0 | 2 |
| --- | --- |
| #1 | d1 |
| #2 | r1 |
| #3 | f1 |
| #4 | f2 |
| #5 | |
| #6 | |

FIG.5(b)

| #0 | 3 |
| --- | --- |
| #1 | d1 |
| #2 | θ1 |
| #3 | w1 |
| #4 | f1 |
| #5 | f2 |
| #6 | d2 |

N01 G01 G91 X-#1 F#4
N02 G65 #6 = #3 *TAN *2
N03 X*6 Z-#3 F*5
N04 M02

XX REMACHINING FUNCTION XX

1. Angle infeed cycle
2. Infeed + arc forming cycle
3. Infeed + tapering cycle
4. Infeed + convex arc forming cycle

FIG. 11(b)

XX INFEED + ARC FORMING CYCLE XX

Infeed rate : f1
Arc grinding feed rate : f2

NUMERICAL CONTROL APPARATUS HAVING MEMORY STORAGE FOR MACHINE PATTERNS, PLURAL INDIVIDUALLY SELECTABLE REMACHINING PATTERNS, AND CONTROL PARAMETERS

BACKGROUND OF THE INVENTION

1. Field of the Invention

The present invention relates to a control apparatus for controlling relative movement between a tool and a workpiece on a machine tool in accordance with a numerical control program.

2. Description of the Prior Art

In a numerical control machine tool, a workpiece can be precisely machined to a desired dimension in so far as a numerical control program is input correctly. However, when one of a plurality of portions to be machined of a workpiece is not machined to a desired dimension due to errors in inputting numerical control data, said one portion has to be remachined subsequently.

In this case, an attempt may be made to revise a part of the numerical control program which causes an undesired dimension at the one portion of the workpiece and then, to perform the machining operation again in accordance with the revised numerical control program. However, such an attempt may results in that desirably finished portions of the workpiece which do not require remachinings are damaged to have, for example, scratches by the contact with a machining tool. To avoid this problem, in a known machine tool, the operational mode is switched from an automatic mode to an individual mode, and a manual pulse generator is then manipulated to move a tool in such a manner as to remachine a portion of the workpiece which has not been machined to a desired dimension.

In the known machine tool of the type mentioned above, since the remachining of the workpiece is performed by moving the tool by the manipulation of the manual pulse generator, it is possible to remachine those portions which can be machined by moving the tool along one control axis at a time, but impossible to remachine precisely those portions such as arcs, tapered surfaces and so forth which cannot be precisely machined in a manner other than the simultaneous distribution of pulses to two control axes.

SUMMARY OF THE INVENTION

Accordingly, it is an object of the present invention to provide an improved machine tool control apparatus capable of remachining in an automatic mode a workpiece portion such as an arc or a tapered surface which requires the simultaneous distribution of pulses to two control axes of a machine tool.

Briefly, according to the present invention, there is provided a machine tool control apparatus comprising a memory device, a data input device and a feed control device. The memory device includes a first storage area for storing a plurality of remachining operation programs each defining a grinding cycle pattern in which a tool support and a work table of a machine tool are to be moved for remachining one of portions of a workpiece carried on the work table. The data input device is manually operable for inputting first data designating one of the remachining operation programs in addition to second data indicative of feed amounts and rates through and at which the tool support and the work table are to be moved in accordance with one of the remachining operation programs designated by the first data. When the remachining of one of the portions of the workpiece is to be done, the first and second data are input by the data input device for storage in a second storage area of the memory device. Upon completion of this data inputting, a grinding wheel on the tool support is moved to a remachining start position from which the remachining operation is to be initiated. Then, a remachining start command is manually given, in response to which the feed control device controls movements of the tool support and the work table in accordance with the designated one of the remachining operation programs and the second data stored in the memory device.

With this configuration, the feed control device is operated in an automatic mode in response to the remachining start command. This advantageously makes it possible not only to perform the remachining of a workpiece portion automatically, but also to perform the remachining of an arc or tapered portion which cannot be done in a manual mode because of requiring the simultaneous distribution of pulses to two control axes of the machine tool.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

DETAILED DESCRIPTION OF THE PREFERRED EMBODIMENT

Figure 1:
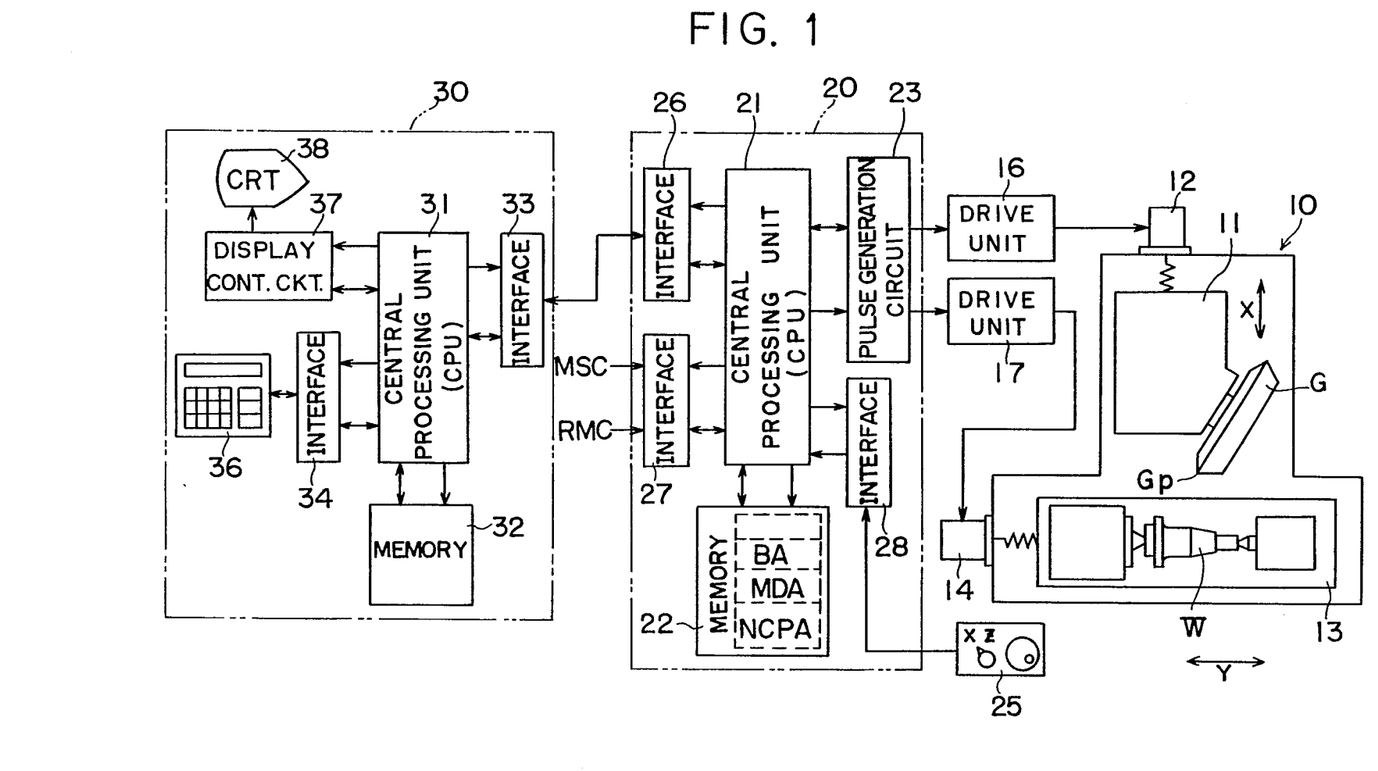
FIG. 1 is a block diagram of a control apparatus for a grinding machine whose schematic plan view is also shown therein.

Referring now to FIG. 1, 10 denotes a grinding machine, 20 a numerical controller and 30 an interactive data input device. The grinding machine 10 comprises wheel head 11 rotatably carrying a grinding wheel G and a work table 13 for mounting a workpiece W thereon. The wheel head 11 and the work table 13 are movable by servomotors 12, 14 which are rotationally driven by drive units 16, 17, respectively.

The numerical controller 20 is composed of a central processing unit (hereafter referred to as "CPU") 21, a memory 22, a pulse generation circuit 23, and interfaces 26, 27, 28. The pulse generation circuit 23 is connected to supply the drive circuits 16, 17 with feed pulses. The interface 28 is coupled to a manual pulse generator 25.

Figure 2:
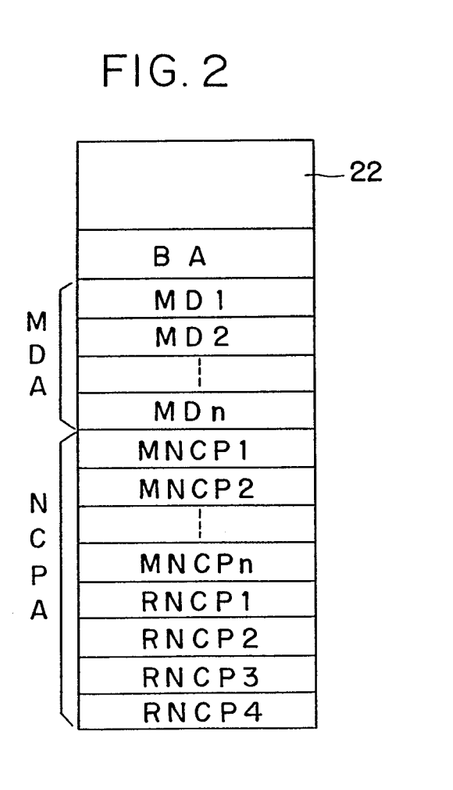
FIG. 2 is an explanatory view illustrating the configuration of a memory 22 shown in FIG. 1.
Figure 3A:
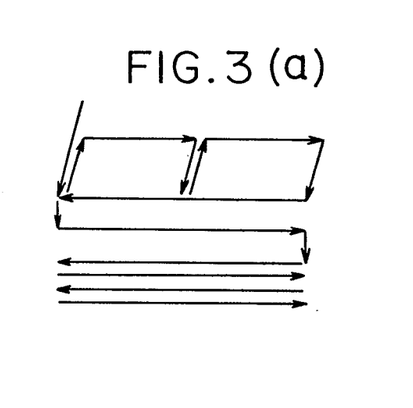
FIGS. 3(a) and 3(b) are charts exemplifying two continuous machining cycles.
Figure 3B:
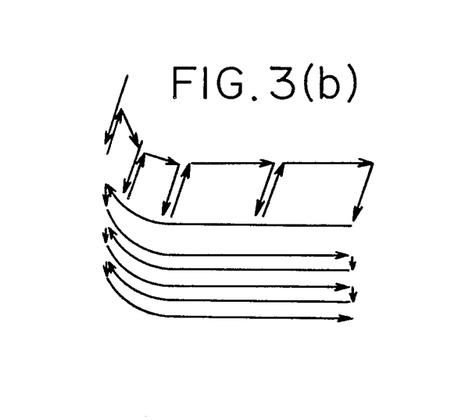
Figure 4A:
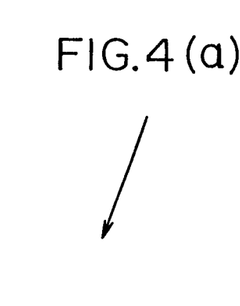
FIGS. 4(a) through 4(d) are charts exemplifying four remachining cycles.
Figure 4B:
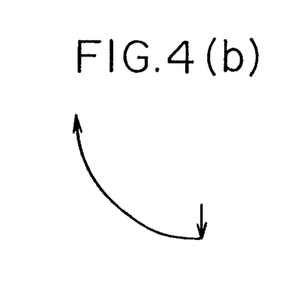
Figures 4C, 4D:
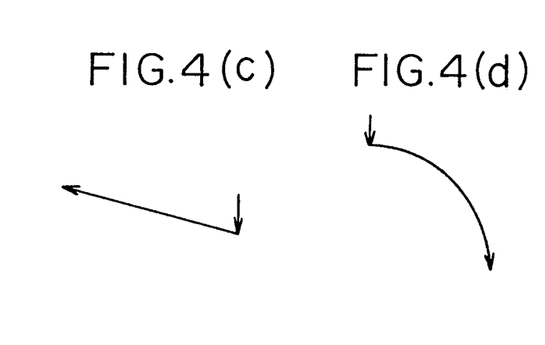
Figure 6A:
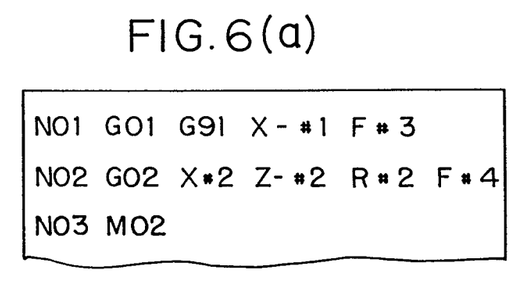
FIGS. 6(a) and 6(b) are explanatory views respectively showing remachining numerical control programs.
Figure 6B:
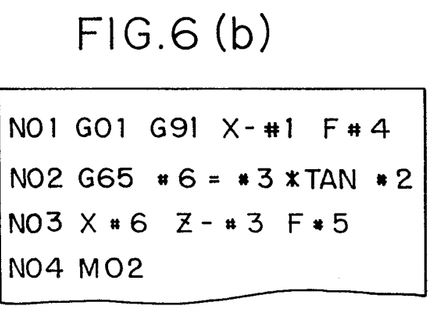

Also shown in FIG. 2, the memory 22 is formed therein with a machining data storage area MDA, a numerical control (NC) program storage area NCPA, and remachining information storage buffer area BA. The NC program storage area NCPA stores a plurality of remachining NC programs RNCP1–RNCP4 shown in FIGS. 4(a)–4(d), in addition to a plurality of machining NC programs MNCP1–MNCPn which respectively correspond to conventional machining cycles as exemplified in FIGS. 3(a) and 3(b). In each of the NC programs MNCP1–MNCPn and RNCP1–RNCP4, as shown in FIGS. 6(a) and 6(b), actual feed amounts and rates are not programmed, but the feed amounts and rates and the like are programmed using variables (e.g., #1, #2, #3, . . .) each indicating a data storage location of the machining data storage area MDA and the remachining information storage buffer area BA.

The machining data storage area MDA stores information on the kinds of grinding cycles and data on the feed amounts and rates and so forth for each machining step. As will be described later in detail, the CPU 21 is programmed to execute numerical control operations by successively selecting machining data for plural machining steps. The remachining information storage buffer area BA is set with data such as a remachining cycle number, feed amounts and feed rates when a remachining operation is to be carried out. However, it is programmed to clear the stored contents upon completion of the remachining operation.

The interactive data input device 30 is composed of a CPU 31, a memory 32, a key board 36, a display control circuit 37, a CRT display device 38 and interfaces 33, 34. The CPU 31 is coupled to the CPU 21 of the numerical controller 21 through the interfaces 33 and 26. The data input device 30 has a function to automatically prepare machining data MD1–MDn for respective machining steps based upon finish shape data and grinding cycle information which are input using the CRT display device 38 and the key board 36 for the respective machining steps. The automatically prepared machining data MD1–MDn are transferred through the interface 33 to the numerical controller 20 for storage in the machining data storage area MDA of the memory 22.

The interactive data input device 30 has another function to enable an operator to input the remachining information in conversational mode and to transfer the input remachining information to the numerical controller 20, as will be described later in detail.

Operations of the interactive data input device 30 and the numerical controller 20 will be described hereafter in connection with an ordinary machining operation and a remachining operation.

(i) Operation in Ordinary Machining

In the case of machining of an unfinished workpiece, machining data MD1–MDn corresponding to respective machining steps are prepared by the interactive data input device 30 and are stored in the machining data storage area MDA of the memory 22 of the numerical controller 20 in advance of the actual machining operation. Accordingly, when a machining start command MSC is applied to the numerical controller 20, the CPU 21 executes the processings shown in FIG. 7 to perform numerical control in accordance with the machining data MD1–MDn being stored in the machining data storage area MDA.

Figure 7:
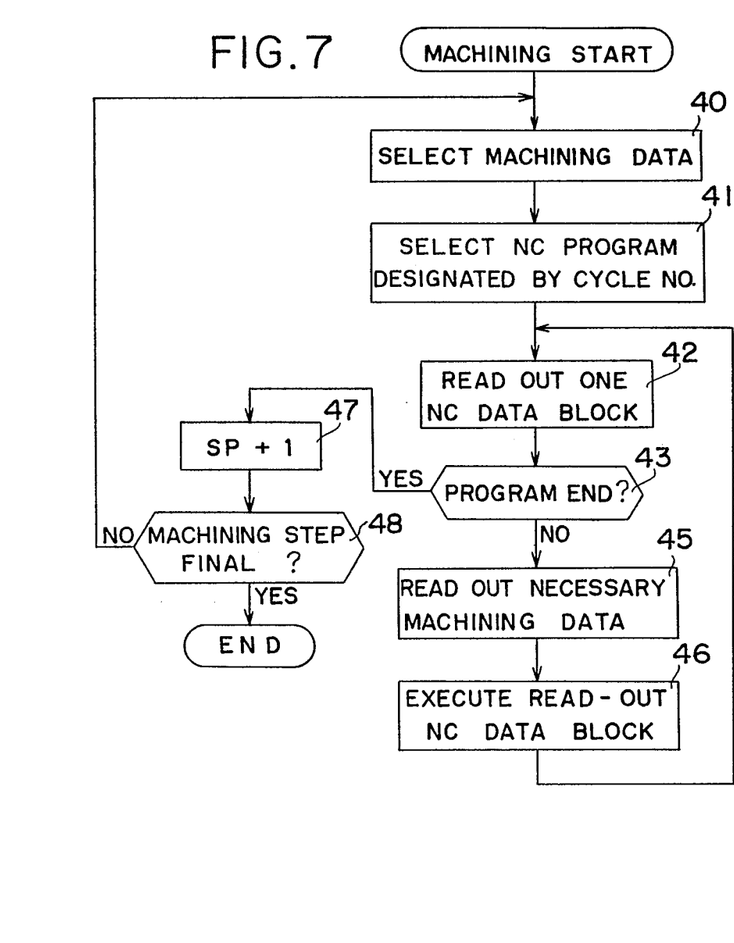
FIG. 7 is a flow chart of a system program executed by a central processing unit 21 shown in FIG. 1 in controlling the grinding machine in a continuous mode.

More specifically, the CPU 21 selects one of the machining data MD1–MDn (step 40) and also selects one of the NC programs MNCP1–MNCPn which is designated by machining cycle number information included in the first address of the selected machining data (step 41).

Subsequently, one data block of the selected NC program is read out from the memory 22 (step 42), and if the read-out one data block is ascertained not to include a program end command (step 43), necessary data are selected from the selected one machining data, e.g., MD1 (step 45). A pulse distribution operation is performed based upon the read-out one NC data block and the read-out machining data, whereby feed movements of the work table 13 and the wheel head 11 are controlled independently or simultaneously (step 46). Steps 42 through 46 are repeated until one portion of the workpiece W is finished.

When the machining of the one workpiece portion is completed, the program end command is read out (step 42) and detected (43). Thus, a step counter which is formed in the CPU 21 in a usual manner to designate a completed machining step number is incremented (step 47), and it is ascertained whether or not the last machining step has been completed, by reference to the content of the step counter (step 48). This ascertainment is done by comparing the content of the step counter with a machining step command which is defined in a machining step table (not shown) in connection with the selected one NC program. When the last machining step has not been completed yet, steps 40 and 41 are executed and steps 42–46 are repeatedly executed, whereby another or second portion of the workpiece W is finished. When the last machining step is completed, on the contrary, the processings of FIG. 7 are discontinued, and the machining operation of the workpiece W is completed.

(ii) Operation in Workpiece Remachining

The workpiece remachining is performed in order to correct a dimensional error at a portion of the finished workpiece W. In this case, an operator manipulates the key board 36 to change the operational mode of the interactive data input device 30 to a remachining information input mode.

Figure 8:
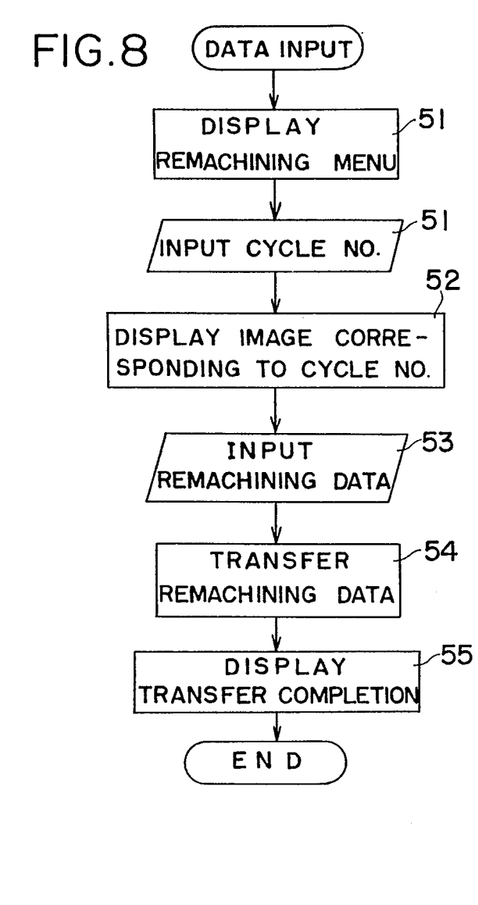
FIG. 8 is a flow chart of another system program executed by another central processing unit 31 shown in FIG. 1 in inputting data shown in FIGS. 5(a) or 5(b)
Figure 11A:
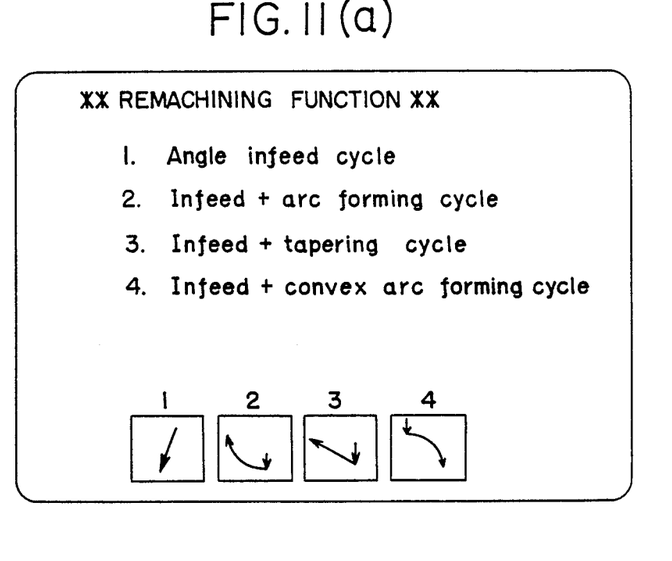
FIGS. 11(a) through 11(c) are explanatory views respectively showing images selectively displayed on a screen of a CRT display unit 38 shown in FIG. 1.
Figure 11B:
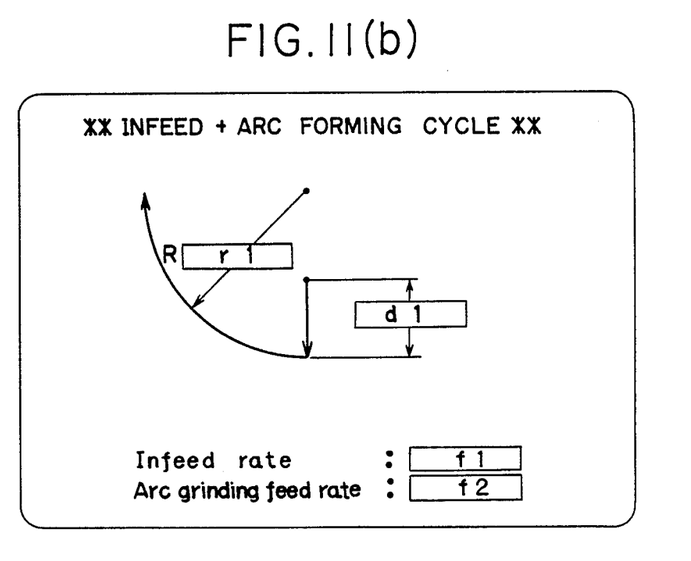
Figure 11C:
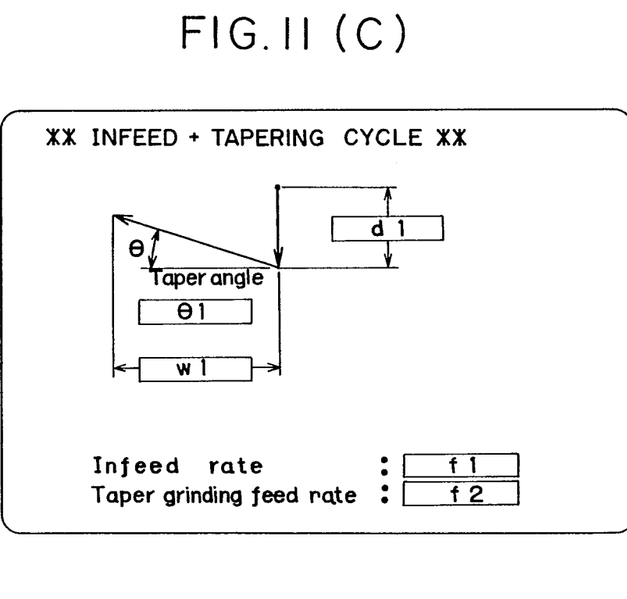

This causes the CPU 31 of the interactive data input device 30 to execute processings shown in FIG. 8. First of all, a menu image shown in FIG. 11(a) is displayed on the CRT unit 38 for the selection of remachining cycles by the operator (step 50). When a cycle number is input by means of the key board 36 to select one of the remachining cycles, it is stored in an internal buffer, not shown (step 51). Then, a data input image which enables operator to input remachining information necessary for the execution of the selected remachining cycle is displayed on the CRT unit 38 (step 52), and the remachining information is input in accordance with instructions displayed on the CRT unit 38 so as to be stored in the internal buffer (step 53).

Where an arc remachining cycle with a number "2" shown in FIG. 11(a) is selected (step 51), for example, a data input image shown in FIG. 11(b) is displayed on the CRT unit 38 (step 52) to make a request for the inputting of data on an infeed amount d1, an arc radius r1, an infeed rate f1 and an arc grinding feed rate f2. The requested remachining information is input by means of the key board 36 and is stored in the internal buffer (step 53).

Where a taper surface remachining cycle with a number "3" is selected, a data input image shown in FIG. 11(c) is displayed (step 52). Therefore, data on an infeed amount d1, a taper angle $\theta 1$, a taper surface width w1, an infeed rate f1 and a taper surface grinding feed rate f2 are input to be stored in the internal buffer (step 53).

Figure 9:
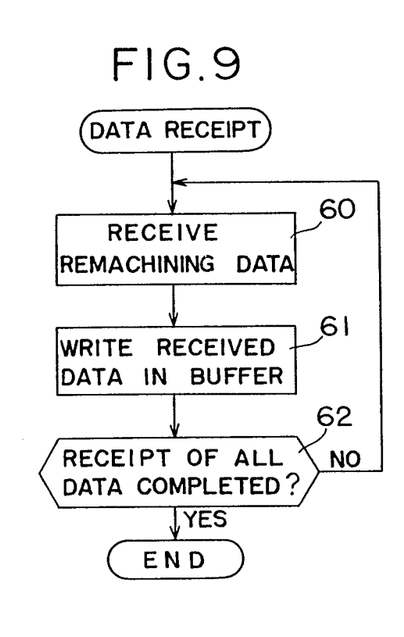
FIG. 9 is another system program executed by the central processing unit 21 in receiving data transferred from the central processing unit 31.

When information necessary for the remachining of the workpiece W is input in this manner, the CPU 31 transfers the input remachining information to the CPU 21 of the numerical controller 20 on a data-by-data basis (step 54). Upon the transfer start of the remachining information, the CPU 21 executes processings shown in FIG. 9 to receive the transferred remachining information on the data-by-data basis (step 60) and to store the received data in the remachining information storage buffer are BA in turn from the first address toward the last thereof (step 61). These processings are repeated until the transfer of all the data is completed. When all of the remachining information has been transferred to the numerical controller 20, the CPU 31 of the interactive data input device 30 displays on the CRT unit 38 a message notifying the operator as to the completion of transfer of all the information (step 55).

After inputting the remachining information in the manner described above, the operator manipulates the manual pulse generator 25 to move the work table 13 and the wheel head 11 so that the grinding wheel G is positioned to a feed start position of a workpiece portion to be remachined. For example, in the case of remachining of the arc with the number "2", an apex point Gp of the grinding wheel G is positioned to the start position of the arc. Subsequently, a remachining switch on a manipulation board (not shown) is depressed to apply a remachining command RMC to the numerical controller 20.

Figure 5A:
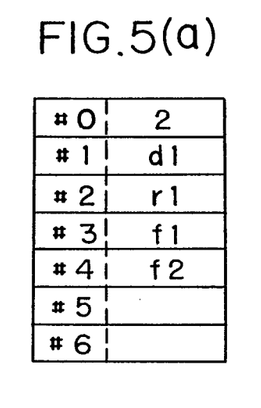
FIGS. 5(a) and 5(b) are explanatory views respectively showing different states of a remachining information storage buffer area BA shown in FIG. 2.
Figure 5B:
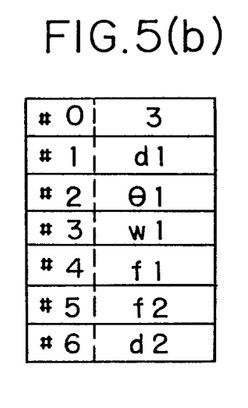
Figure 10:
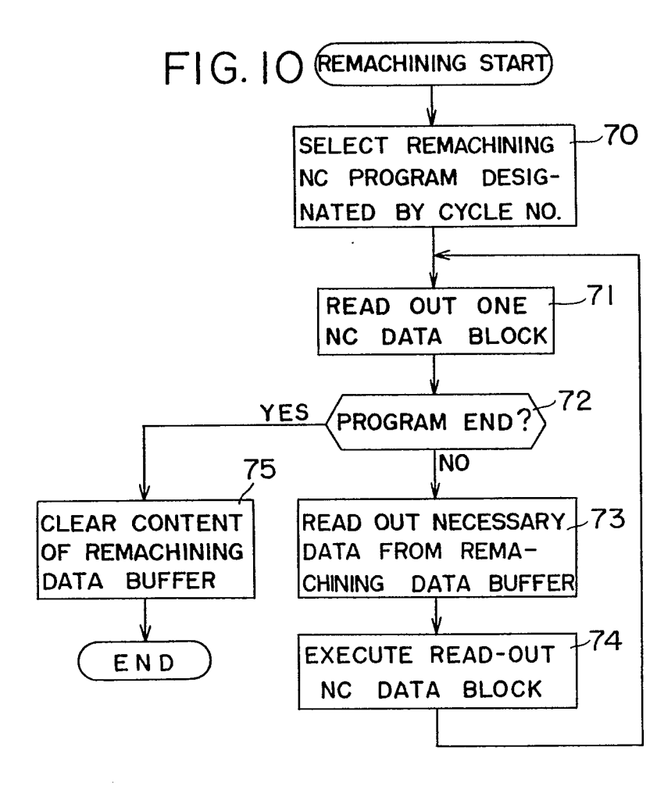
FIG. 10 is still another system program executed by the central processing unit 21 in controlling a remachining operation of the machine tool.

When the remachining command RMC is applied to the numerical controller 20, the CPU 21 executes remachining processings shown in FIG. 10. At the beginning, the CPU 21 reads out data representing a remachining cycle number which is stored as #0 variable at the first address of the remachining information storage buffer area BA as exemplified in FIGS. 5(a) and 5(b) and then, selects a remachining NC program designated by the read-out remachining cycle number data (step 70). For example, in the case where the arc remachining cycle with a number "2" is designated, a remachining NC program RNCP2 shown in FIG. 6(a) is selected by the processing in step (70). In the case where the taper surface remachining cycle with a cycle number "3" is designated, a remachining NC program RNCP3 shown in FIG. 6(b) is selected.

Upon completion of the selection of a remachining NC program RNCP in this manner, the CPU 21 reads out the selected remachining NC program RNCP block by block (step 71). If the read-out one data block is not a code M02 representing the program end (step 72), the CPU 21 reads out from the remachining information storage buffer area BA data such as a feed amount, a feed rate and the like respectively corresponding to the variables included in the read-out one data block (step 73) and executes a numerical control processing such as a pulse distribution processing in accordance with the read-out one data block and feed amount and rate data (step 74).

Assuming now that the arc remachining cycle with the cycle number "2" is designated for the execution of the remachining NC program RNCP2 shown in FIG. 6(a), data "G01 G91X-#1 F#3" programmed in the NO. 1 block are read out. In response to this data reading-out, an infeed amount d1 and a feed rate f1 which are respectively stored as #1 and #3 variables in the remachining information storage buffer area BA are read out, whereby a pulse distribution operation is performed in such a manner as to move the wheel head 11 by the infeed amount d1 at the feed rate f1. When the NO. 2 block data "G02 X#2 Z-#2 R#2 F#4" are read out thereafter, an arc radius r1 and an arc grinding feed rate f2 which respectively correspond to the #2 and #4 variables included in the read-out data block are read out from the remachining information storage buffer area BA. Thus, the simultaneous distribution of pulses to two control axes, namely to the servomotors 12 and 14 is performed in accordance with these read-out data so that the wheel head 11 and the work table 13 are simultaneously moved in such a manner as to move the grinding wheel G relatively to the workpiece W along an arc of the radius r1 at the feed rate f2.

Further, where the taper surface remachining cycle is designated as the remachining cycle to be done, the remachining NC program RNCP3 shown in FIG. 6(b) is executed in a manner similar to that described above. It is to be noted herein that the No. 2 data block of this NC program RNCP3 is provided for calculating an amount d2 through which the grinding wheel G is to be retracted in the X-axis direction during the taper grinding operation. The result of such calculation is stored in a storage location of the buffer area BA reserved for storage of a #6 variable and is used when a NO. 3 data block of the NC program RNCP3 is executed.

As described hereinabove, when a remachining NC program selected based upon remachining information is executed, a portion of the workpiece W is remachined, whereby the workpiece W is finished to a desired or programmed dimension. Then, a code M02 is read out, at which time the completion of the execution of a remachining NC program is confirmed (step 72). Upon this confirmation, the CPU21 clears the information stored in the remachining information storage buffer area BA to initialize the same (step 75).

Accordingly, even when the remachining start switch (not shown) is erroneously depressed upon completion of a remachining operation, the wheel head 11 and the work table 13 are not moved though the CPU 21 is caused to execute the processings shown in FIG. 10. This makes it possible that the grinding wheel G can be reliably prevented from being moved due to the erroneous depression of the remachining start switch and from damaging the workpiece W and the machine tool components.

In the above-described embodiment, the erroneous reexecution of a remachining operation is prevented by clearing the content of the buffer area BA immediately after the remachining operation. However, the same result as in the above-described embodiment can be achieved where the CPU 21 is programmed to move data of the buffer area BA to a secondary buffer area (not shown) in response to the depression of the remachining start switch, to initialize the buffer area BA subsequently, and to execute the remachining program by reference to the data stored in the secondary buffer area.

It is also to be noted that the present invention may be applied to numerical control machine tools of other kinds such as, for example, a numerical control lathe.

Obviously, numerous modifications and variations of the present invention are possible in light of the above teachings. It is therefore to be understood that within the scope of the appended claims, the present invention may be practiced otherwise than as specifically described herein.

What is claimed is:

1. A control apparatus for a grinding machine wherein a tool support and a work table are movable by first and second feed devices respectively in first and second directions so as to successively grind a plurality of portions of a generally cylindrical workpiece rotatably carried on said work table, said control apparatus comprising:

first storage means for storing a numerical control program which is prepared for successively grinding said plurality of portions of said workpiece;

second storage means for storing a plurality of regrinding operation programs each defining a grinding cycle pattern which includes cut-in feed movement and 2 axis movement along a single path of a grinding wheel rotatably carried on said tool support for regrinding one of said portions of said workpiece;

third storage means corresponding only to a specific portion of the workpiece which is to undergo regrinding and for storing program designation data designating one of said regrinding operation programs and parameters which are required to move said grinding wheel a desired distance at a desired cut-in feed rate when said tool support and said work table are to be moved simultaneously in accordance with a designated one of said regrinding operation programs;

data input means for manually inputting said program designation data and said parameters for storage in said third storage means;

position setting means including a manually operable pulse generator for moving said tool support and said work table to position said grinding wheel to a start position at which a cut-in feed of the grinding wheel is executed in relation to said specific portion of the workpiece which is to undergo regrinding; and feed control means connected to said first and second feed devices and responsive to a grinding start command for controlling operations of said first and second feed devices in accordance with said numerical control program stored in said first storage means, so as to successively grind said plurality of portions of said workpiece, said feed control means being also responsive to a regrinding start command for controlling said first and second feed devices in accordance with said designated one of said regrinding operation programs and said parameters stored in said second and third storage means so that immediately after regrinding of said specific portion of the workpiece, the grinding wheel is removed from the workpiece and the regrinding operation is completed.

2. A control apparatus as set forth in claim 1, wherein said data input means comprises:

a graphic display device;

first input enabling means responsive to a remachining information input command manually given for partial profile correction after the grinding of all of said portions of said workpiece, for displaying on said graphic display device a menu of said grinding cycle patterns corresponding to said regrinding operation programs so as to enable an operator to manually input said program designation data;

second input enabling means responsive to said program designation data for displaying on said graphic display device one of said grinding cycle patterns designated by said program designation data, so as to enable said operator to manually input said parameters required for the execution of said designated one of said regrinding operation programs; and a key board manually operable for inputting said program designation data when said menu of said grinding cycle patterns is displayed on said graphic display device and for inputting said parameters when said designated one of said grinding cycle patterns is displayed on said graphic display device.

3. A control apparatus as set forth in claim 1, further comprising:

safety means for preventing said first and second feed devices from being controlled twice in succession in accordance with said one regrinding operation program selected in response to said program designation data input by said key board and said parameters stored in said third storage means.

4. A control apparatus as set forth in claim 3, wherein said safety means comprises:

means for clearing the content of said third storage means after said first and second feed devices are controlled in accordance with said one regrinding operation program selected in response to said program designation data and said parameters stored in said third storage means.

* * * * *